United States Patent [19]

Keller

[11] Patent Number: 5,030,518

[45] Date of Patent: Jul. 9, 1991

[54] MULTI-LAYER THERMAL INSULATION, ESPECIALLY FOR SPACECRAFT

[75] Inventor: Karl Keller, Munich, Fed. Rep. of Germany

[73] Assignee: Messerschmitt-Boelkow-Blohm GmbH, Munich, Fed. Rep. of Germany

[21] Appl. No.: 281,819

[22] Filed: Dec. 8, 1988

[30] Foreign Application Priority Data

Dec. 9, 1987 [DE] Fed. Rep. of Germany ....... 3741732

[51] Int. Cl.$^5$ .............................................. B22F 3/10
[52] U.S. Cl. ................................... 428/550; 428/138; 428/546; 428/547; 428/548; 428/549; 428/551; 428/920; 428/921
[58] Field of Search ............... 428/138, 546, 547, 548, 428/549, 550, 551, 920, 921

[56] References Cited

U.S. PATENT DOCUMENTS 4,344,591 8/1982 Jackson .............................. 244/158

Primary Examiner—James J. Bell
Attorney, Agent, or Firm—W. G. Fasse; D. H. Kane, Jr.

[57] ABSTRACT

A high temperature multi-layer thermal insulation is constructed especially for insulating spacecraft. For this purpose the insulation is formed of a plurality of porous material layers, such as ceramic fiber layers, separated from each other by highly reflective gas permeable foils. The insulation has an outer hot side and an inner cold side. The ceramic fibers are so arranged that the layer density increases from the outer side toward the inner side while the fiber diameter decreases from the outer side ot the inner side. Compared to conventional heat shield type insulations of spacecraft, the present insulation is relatively lightweight and is able to better discharge again at lower flight altitudes any heat stored in the insulation at higher transient re-entry altitudes.

23 Claims, 3 Drawing Sheets

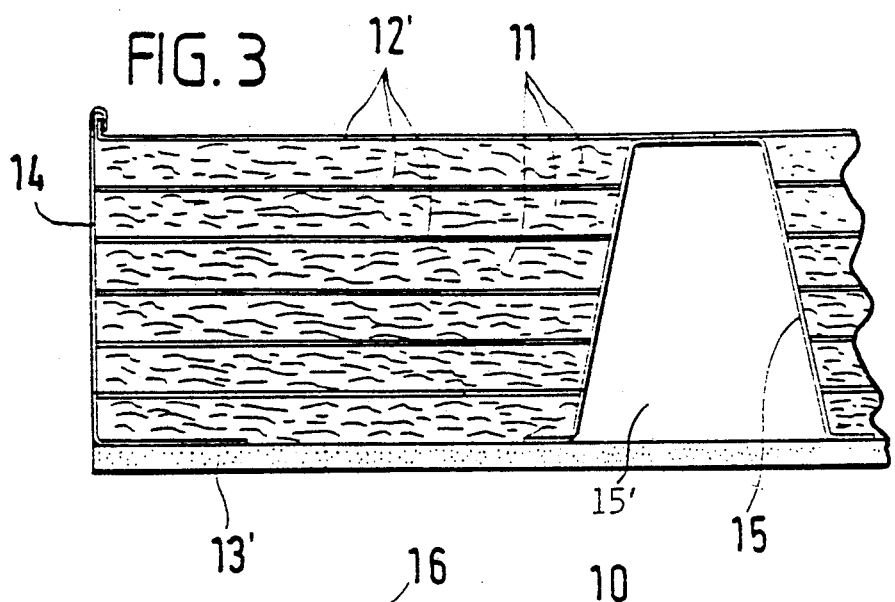
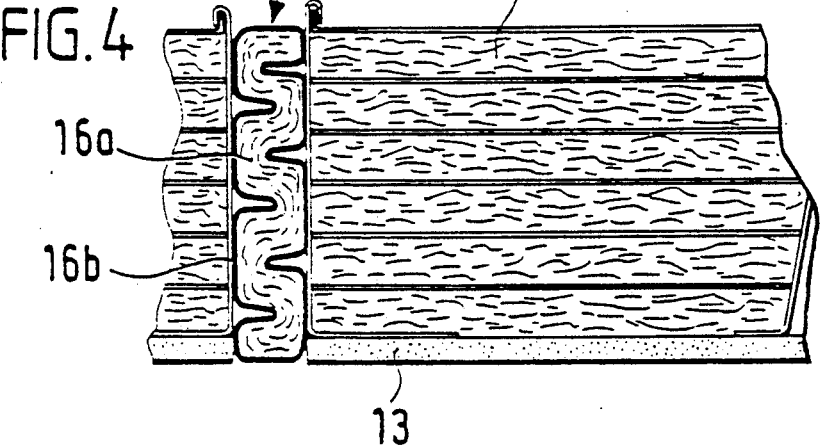
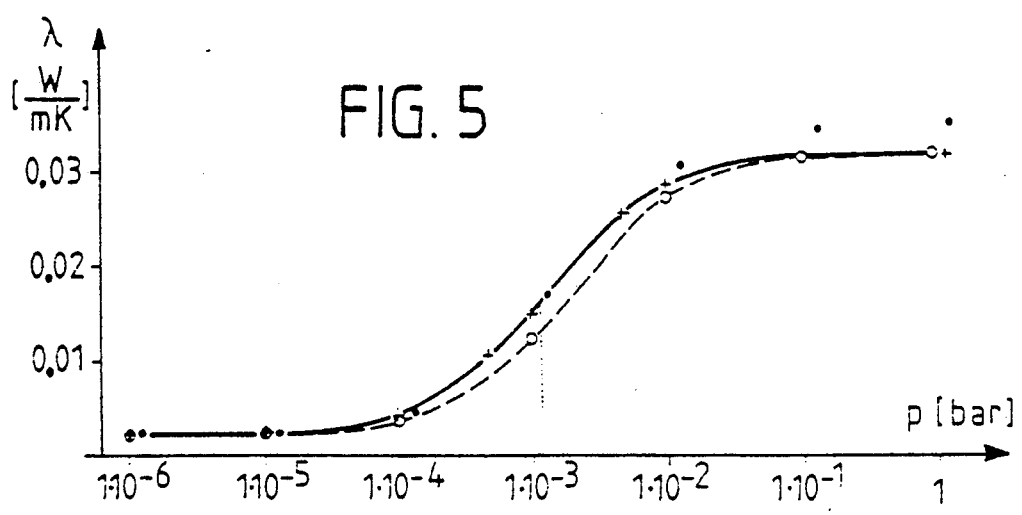

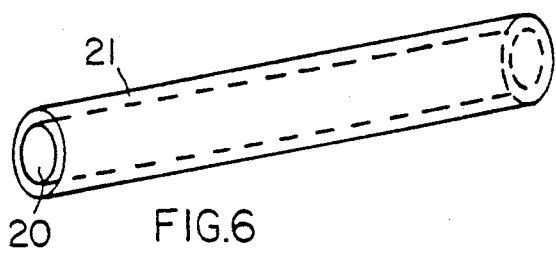

MULTI-LAYER THERMAL INSULATION, ESPECIALLY FOR SPACECRAFT

FIELD OF THE INVENTION

The invention relates to a multi-layer thermal insulation, especially for thermally insulating spacecraft with packets of substantially enclosed porous layers.

BACKGROUND INFORMATION

Multi-layer thermal insulation, for example, for insulating so-called re-entry vehicles are generally known in various embodiments. Such multi-layer insulation achieves a considerably increased thermal insulation compared to a single layer insulation having same weight as the multi-layer insulation.

Conventional applications of such multi-layer insulation involve static pressure conditions, for example, for use near the earth's surface or alternatively in a vacuum (conventional satellite multilayer insulation). These conditions do not apply to re-entry spacecraft. During re-entry of a spacecraft into the earth's atmosphere the pressure in a multi-layer insulation varies, dependent upon the spacecraft flight altitude, whereby the thermal conductivity of the insulation increases due to the presence of gases contained in the multi-layer insulation. For example, at a certain flight altitude and for a certain arrangement and selection of specific insulation layers half of the total thermal conduction through the multi-layer insulation may be due to the thermal conduction by the gases contained in the multi-layer insulation.

For typical re-entry trajectories the maximum aerodynamic heating of the spacecraft occurs at relatively high flight altitudes, for example 75 to 65 km and correspondingly low pressures. On the other hand, at lower flight altitudes and correspondingly higher pressures, the outer skin of the spacecraft is heated to a much lower extent or is even cooled.

All of the previously known embodiments of multi-layer thermal insulation have either a relatively high weight or are relatively thick so that they increase either the total weight of the spacecraft or also not insignificantly increase the total dimensions of the spacecraft. In other words, by applying relatively thick insulation layers onto the fuselage skin of the spacecraft, either the outer dimensions of the craft are increased or the usable interior space of the craft is decreased.

U.S. Pat. No. 4,344,591 discloses a high temperature multiwall thermal insulation system comprising sandwich panels with flat and dimpled metal foils. Between the outer panels and the inner panel an intermediate fiber insulation as e.g. Johns Manville's microquartz mat having a density of 72 kg/m$^3$ is provided. The thermal insulation system of said U.S. Patent is also characterized by a disadvantageous weight.

OBJECTS OF THE INVENTION

In view of the foregoing it is the aim of the invention to achieve the following objects singly or in combination:

to provide an improved multi-layer thermal insulation to be used in heat shields, especially for earth atmosphere re-entry vehicles, said insulation having a reduced weight and smaller dimensions relative to the prior art while achieving the same or better heat insulation characteristics;

to reduce the thermal conduction through gases in such a multi-layer thermal insulation so that the insulation is effective, not only under static pressure conditions, but also under varying pressure conditions, especially at high and middle re-entry flight altitudes;

to reduce the radiative thermal transmission through such a multi-layer thermal insulation; and to construct such a multi-layer thermal insulation in such a manner that heat which has been stored in the insulation system during a transient re-entry is preferentially transmitted outwardly and transmitted from the thermal insulation to the atmosphere during flight at low flight altitudes.

SUMMARY OF THE INVENTION

The above objects have been achieved in a multi-layer thermal insulation according to the invention, which is characterized by packets of substantially enclosed or fully encapsulated porous layers, such as ceramic fiber layers, whereby the fiber fill layers of each multi-layer insulation packet are separated from one another by at least one highly reflective gas permeable foil layer or several such layers. The average fiber diameter of the fiber fill of the several fiber layers decreases from the outer hotter layer, to the inner cooler layer. The density of the fiber layers increases from the outer layer to the inner layer, namely, as seen in a direction from the outside surface of the spacecraft toward the the interior of the spacecraft. Of the just mentioned features one or the other or both may be incorporated in an actual embodiment of the present invention.

The graded variation of fiber density and diameter may be achieved by providing fibers with a higher $Al_2O_3$ content on the hot outer side and fibers with a higher $SiO_2$ content on the colder inner side. The fibers are preferentially oriented within each fiber layer, for example oriented in planes perpendicularly to the structural height of each packet, especially in the inner, colder side layer or layers. The structural height defines the thickness of the insulation between its outer and inner surfaces. According to further embodiments of the invention the ceramic fibers of the fiber fill may be at least partially coated with a highly reflecting layer or highly reflective particles may be embedded in the embodiment of the invention the density of successive fiber layers increases from approximately 8 kg/m$^3$ to approximately 40 kg/m$^3$ seen from the outside toward the inside and the corresponding fiber diameter of the layers decreases from approximately 4 $\mu$m to approximately 0.4 $\mu$m.

BRIEF DESCRIPTION OF THE DRAWINGS

In order that the invention may be clearly understood, it will now be described, by way of example, with reference to the accompanying drawings, wherein:

FIG. 3 is a cross-section through an insulation packet according to the invention in the area of a spacer member of the spacecraft structure, whereby respective arrows show the increasing layer density and fiber diameter;

FIG. 4 is a cross-section through two neighboring insulation packets according to the invention forming a gap there-between closed packets with a so-called gap filler arranged between the neighboring packets; and FIG. 5 is a diagram showing the typical thermal conductivity λ curve of a fiber mat dependent on the air pressure at low temperatures.

FIG. 6 is a sketch of the fiber with the reflective coating.

DETAILED DESCRIPTION OF PREFERRED EXAMPLE EMBODIMENTS AND OF THE BEST MODE OF THE INVENTION

Figure 1A:
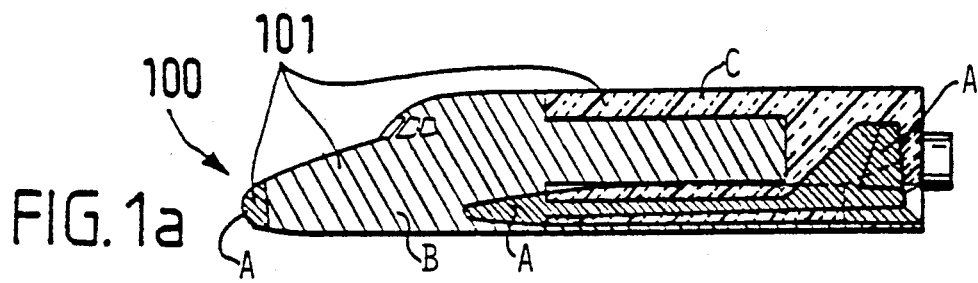
FIG. 1a is a schematic side view of an earth atmospheric re-entry spacecraft with differently hatched surfaces indicating different thermal conditions under which multi-layer heat shields may be employed.
Figure 1B:
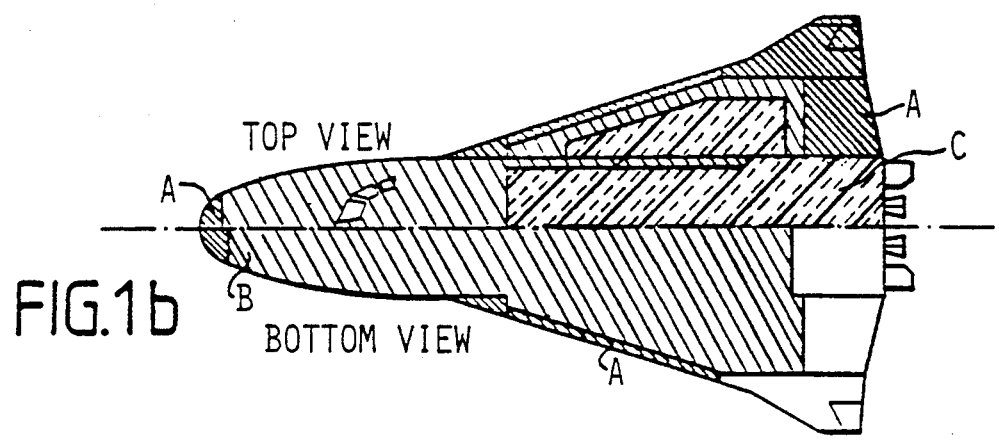
FIG. 1b is a schematic view of the spacecraft of FIG. 1a showing its upper half above the center line and its lower half below the center line and illustrating the location of the present insulating means.

FIGS. 1a and 1b show a spacecraft 100 re-entering the earth's atmosphere. The spacecraft 100 is provided with a so-called heat protective shield under which a multi-layer thermal insulation 101 of the invention is arranged. FIGS. 1a and 1b show different surface temperature conditions and different heat shield embodiments in different surface areas of the spacecraft by means of three different types of hatching. The multi-layer thermal insulation 101 is exposed to these different temperature conditions of surface areas A and B.

The concepts of the invention described herein are especially advantageous in the case of increasing pressure and transient temperature loading with a maximum improvement at low pressures as shown in FIG. 5, wherein the thermal conductivity λ of the present heat insulation is lowest at the lowest pressure.

The multi-layer thermal insulation of the invention is assembled of separate packets 10 as described in detail below with reference to FIG. 2, whereby these packets are arranged appropriately on the surface of the spacecraft corresponding to the varying temperature conditions in different areas of the spacecraft surface Specifically, hot structural components exist in areas A at the nose cone of the spacecraft, along the wing sweep and on the control surfaces. Areas B are covered with structural components made as stiffened plates or shingles. Areas C represent a flexible insulation structure. The invention makes it possible to place specialized insulation packets in each of the first two above described areas A and B of the spacecraft. In other words, the present packets are constructed in accordance with the special requirements applicable to each area A and B, and also area C if needed or desired.

Figure 2:
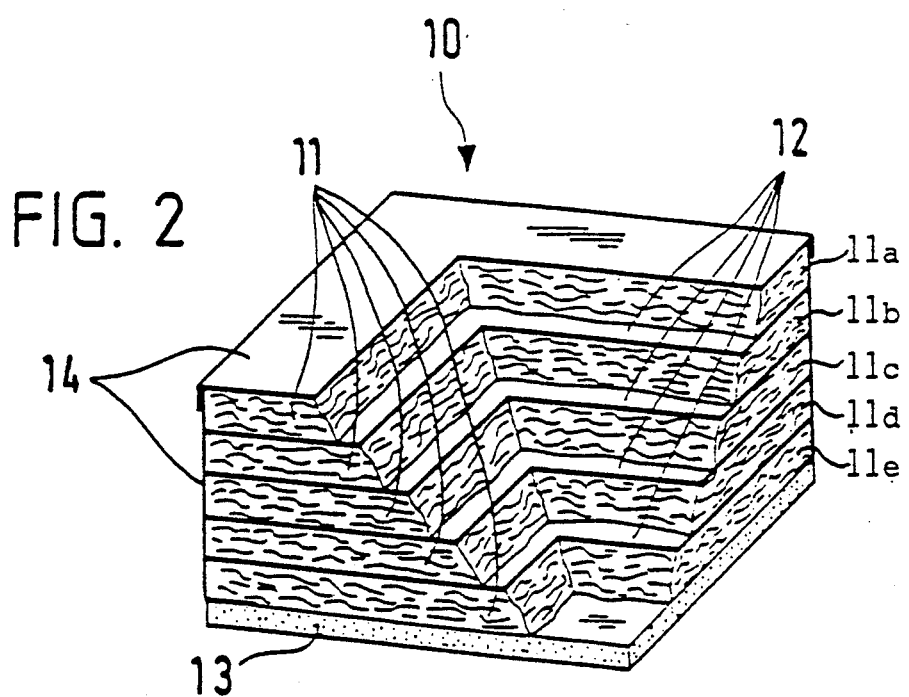
FIG. 2 is a partially sectioned perspective view of a multi-layer insulation packet according to the invention.

As shown in FIG. 2, each packet 10 comprises several layers 11a, 11b, 11c, 11d, 11e of a ceramic fiber fill 11. These layers 11a to 11e are separated from one another by highly reflective substantially perforated metal foil layers 12. The layer density of the ceramic fiber layers 11a to 11e increases from the outside at the top surface, to the inside at the bottom of the packet. Stated differently, layer 11a which is closest to the outer side has the smallest fiber fill density, while the layer 11e closest to the inner side formed by a bottom plate 13, has the largest fiber fill density. The fiber diameter decreases respectively from layer 11a to layer 11e. Further, the ceramic fiber filling 11 of each, of the multi-layer insulation packets 10 comprises fibers with a high $Al_2O_3$ content near the hot side or outside and fibers with a high $SiO_2$ content near the cold or inner side. That is to say, layer 11a has a high $Al_2O_3$ composition and layer 11e has a high $SiO_2$ composition of the fibers.

More specifically, with reference to FIG. 2 in a specific example embodiment, each of the porous layers in the form of ceramic fiber filled layers 11, has a thickness of approximately 1 to 10 mm. Neighboring layers are separated from each other by perforated highly reflective metal foil layers 12 or metallized foils. Such a layer bundle is substantially enclosed or fully encapsulated to form the packet 10, whereby the enclosure or encapsulation comprises an impermeable metal foil or foil cover 14 on the hotter outer side and on the lateral sides and an water repellent impregnated open cell polyimide foam plate 13 on the cooler inner side.

As shown in FIG. 3, an encapsulated insulation packet 10 to be applied in region B is arranged between the spacecraft structure 13' and its mechanical load bearing heat shield surface 12'. Cavities 15 are arranged in the packets 10 for receiving the necessary spacer members 15' between the spacecraft structure 13' and the heat shield surface 12'.

FIG. 4 shows insulation joints between two neighboring insulation packets 10a and 10b forming a gap 10c in which a so-called gap filler 16 is arranged between the neighboring packets. The gap filler 16 may, for example, comprise a ceramic fiber layer core 16a covered by a perforated metal foil layer 16b. The gap filler 16 is then inserted between adjacent insulation packets 10. The depressurization and venting of the multi-layer thermal insulation 101 formed of the separate insulation packet 10a, 10b is achieved through these gap fillers 16 and through the open cell polyimide foam plate 13 which is perforated at the gaps.

In an especially advantageous embodiment of the invention for temperatures up to 400° C. an extremely thin, 5 to 10 μm, metallized Kapton (R.T.M.) film (polyimide film) is used as the separating foil layer 12 between fiber layers 11a, b . . . Alternatively, thin metal film layers may be used as separating foil layers 12. For example, for temperatures up to approximately 550° C. Al foils with a thickness of approximately 5 μm are suitable. For temperatures up to approximately 900° C. Au-foils with a thickness of approximately 5 μm or Ni-foils with a thickness of approximately 25 μm may be used. For temperatures of up to approximately 1350° C. Pt coated molybdenum based foils with a thickness of approximately 30 μm may be used. Platinum coated ceramic fiber foil layer is even more advantageous at these high re-entry temperatures. In any event, the term "foil" is intended to cover all these possibilities.

The above mentioned embodiment in which the ceramic fibers have a higher chemical content of $Al_2O_3$ near the hot side and a higher content of crystalline $SiO_2$ or of borosilicate glass near the cold side is especially effective and advantageous for the present purposes. The fiber layers as such are conventional. In order to achieve the optimal advantage of the invention, the density of the ceramic fiber filling 11 increases from the outer layer to the inner layer, that is to say from layer 11a to layer 113, for example, from 8 kg/m$^3$ to 40 kg/m$^3$ while the average fiber diameter respectively decreases from 4 μm to 0.4 μm. In this manner the invention achieves that at flight altitudes less than 50 km and a correspondingly reduced aero-thermal heating the heat which has already been stored in the multi-layer insulation 101 is preferentially given off or discharged to the outside. It is a further advantage if a greater number of foil layers is provided in the packet near the outside as compared to the number of foils near the inside.

Without a fiber filling, the ratio of the conductive thermal flux $q_c$ relative to the radiative thermal flux $q_v$ between two metal ($\epsilon=0.1$ assumed) foils 12 at temperatures $T_1=800°$ C. and $T_2=700°$ C. respectively, a spacing of $\Delta X=1$ cm, and $\epsilon=0.1$ assumed, is approximately unity, ($q_c \approx q_v$). With the present fiber filling 11 described above, $q_c$ is reduced with a dependence upon pressure, fiber diameter, fiber orientation, and porosity. This relationship is shown in FIG. 5 illustrating that the thermal flux has a characteristic which increases with increasing pressure.

As indicated above instead of using the metallic separating foils 12, extremely thin carrier foils such as, for example Kapton (R.T.M.) a polyimide film may be used at temperatures up to 400° C. or glass fiber fabrics or ceramic fiber fabrics for higher temperatures. Such a substrate foil is then coated e.g. by metallic vapor deposition. Alternatively, highly reflective particles may be implanted within the ceramic fiber layers. Alternatively or additionally, the fibers 20 may be coated by a highly reflective material 21 (FIG. 6). The strength and stiffness of the insulation packets 10 may be increased by sewing or point gluing the porous fiber layers to the separating foil layers.

The multi-layer insulation 101 according to the invention as described above is very efficient for transient reentry vehicles entering into the earth's atmosphere at high flight altitudes and furthermore allows the heat stored in the insulation or heat shield system to be given off or discharged externally at low flight altitudes. The thickness and weight of the multi-layer insulation of this invention may be reduced relative to the prior art because of the high insulating efficiency and the discharge of stored heat.

Although the invention has been described with reference to specific example embodiments, it will be appreciated, that it is intended to cover all modifications and equivalents within the scope of the appended claims.

What I claim is:

1. A multi-layer thermal insulation, comprising at least one insulation packet having a first high temperature facing outer side, a second low temperature facing inner side, and lateral sides interconnecting said first and second sides, each packet comprising a plurality of insulating layers of porous material, at least one highly reflective gas permeable foil arranged between and separating said porous material layers to form a sandwich type structure, and enclosing means enclosing at least said first side and said lateral sides, said porous material including constituent elements having characteristics that vary from said first outer side to said second inner side so that at least one of the following characteristics is achieved, an average element diameter is decreasing from said first outer side to said second inner side, and an average fill density is increasing from said first outer side to said second inner side.

2. The thermal insulation of claim 1, wherein said porous material comprises heat insulating fibers forming said insulating layers, said fibers having fiber diameters which decrease from said first outer side to said second inner side.

3. The thermal insulation of claim 1, wherein said porous material comprises heat insulating fibers arranged in said layers so that a layer density increases from said first outer side to said second inner side.

4. The thermal insulation of claim 2, wherein said layers comprise fiber materials with lowest specific density selected in accordance with the operating temperature profile inside the insulation.

5. The thermal insulation of claim 4, wherein said fiber materials comprise alumina fibers and silica fibers forming said insulating layers in such a way that fibers in a layer on said first outer side has a content of up to 96% $Al_2O_3$ for a thermal stability up to 1700° C., while fibers in a fiber layer on said second inner side are silica fibers with a high purity of more than 99.6% $SiO_2$ content.

6. The thermal insulation of claim 2, wherein said fibers of said fiber material are oriented in a preferred orientation direction so that fibers nearer said second inner side extend substantially in planes parallel to said second inner side.

7. The thermal insulation of claim 2, wherein said fibers of said fiber thermal are at least partially coated with a highly reflective coating.

8. The thermal insulation of claim 2, further comprising highly reflective particles embedded in said fiber layers such particles having a diameter of about 0.1 $\mu$m–1.0 $\mu$m and consisting of ferromagnetic materials such as $Fe_3O_4$, $TiO_2$.

9. The thermal insulation of claim 1, wherein said gas permeable, highly reflective foil comprises at least one foil selected from: metal foils of minimum formable thickness including approximately 5 $\mu$m thick Al-foil for temperatures up to approximately 550° C.; approximately 5 $\mu$m thick Au-foil for temperatures up to approximately 900° C.; approximately 5 $\mu$m thick Cu-foil for temperatures up to approximately 900° C.; approximately 25 $\mu$m thick Ni-foil for temperatures up to approximately 900° C.; and approximately 30 $\mu$m thick Pt-coated TZM-foil for temperatures up to approximately 1350° C.; metal foils of minimum formable thickness having a surface coating; metal foils of minimum formable thickness having an ion implanted surface layer; and metal coated substrate layers of minimum formable thickness including aluminized Kapton (R.T.M.) polyimide film for temperatures up to approximately 400° C.; glass fiber cloth vapor coated with precious metal; and ceramic fiber cloth vapor coated with precious metal for temperatures above 400° C. up to 1600° C.

10. The thermal insulation of claim 1, wherein said packet comprises a plurality of said foils arranged so that these foils are more closely spaced from each other near said first outer high temperature side than near said second low temperature inner side.

11. The thermal insulation of claim 1, wherein said enclosing means comprise at least one metal foil layer and an elastic water repellent air permeable baseplate.

12. The thermal insulation of claim 11, wherein said baseplate comprises a plate of open cell polyimide foam.

13. The thermal insulation of claim 1, wherein said enclosing means comprises a high temperature resistant fabric or webbing.

14. The thermal insulation of claim 13, wherein said fabric comprises ceramic fibers such as Neschel (Trademark of the 3M Comp.).

15. The thermal insulation of claim 1, further comprising at least one of spot-glued or spot-sewed areas for attaching said porous material layers to said foil to increase mechanical stability of said packet.

16. The fiber materials of claim 5, wherein said high purity silica fibers may be substituted or completed by borosilicate glass fibers at said second inner side.

17. The thermal insulation of claim 3, wherein said fiber layer density increases from approximately 8 kg/m³ to approximately 40 kg/m³ from said first outer side to said second inner side.

18. The thermal insulation of claim 1, wherein said porous material comprises fibers having an average fiber diameter which decreases from approximately 4 μm at said first outer side to approximately 0.4 μm at said second inner side.

19. A multi-layer thermal insulation comprising a plurality of thermal insulation packets, each packet having a first high temperature facing outer side, a second low temperature facing inner side, and lateral sides interconnecting said first and second sides, each packet comprising a plurality of insulating layers of porous material, at least one highly reflective gas permeable foil arranged between and separating said porous material layers to form a sandwich type structure, and enclosing means enclosing at least said first side and said lateral sides, said porous material including constituent elements having characteristics that vary from said first outer side to said second inner side so that at least one of the following characteristics is achieved: an average element diameter is decreasing from said first outer side to said second inner side, and an average material density is increasing from said first outer side to said second inner side, said thermal insulation packets being arranged in a side-by-side relationship to form gaps between neighboring packets, and thermal insulation gap filler means located in said gaps, said gap filler means comprising at least one fiber material layer and at least one perforated metal foil layer enclosing said fiber material layer on all of its sides.

20. The thermal insulation of claim 19, wherein said fibers in said fiber material layer of said gap filler means are ceramic fibers, and wherein said gap filler means has a meandering configuration.

21. The thermal insulation of claim 3, wherein said layers comprise fiber materials with lowest specific density selected in accordance with the operating temperature profile inside the insulation.

22. The thermal insulation of claim 3, wherein said fibers of said fiber material are oriented in a preferred orientation direction, so that, fibers nearer said second inner side extend substantially in planes parallel to said second inner side.

23. The thermal insulation of claim 7, wherein said highly reflective coating material is selected from the group consisting of nickel, gold, and platinum with coating thicknesses about 0.1 μm.

* * * * *

UNITED STATES PATENT AND TRADEMARK OFFICE
CERTIFICATE OF CORRECTION

PATENT NO. : 5,030,518

DATED : July 9, 1991

INVENTOR(S) : Karl Keller

It is certified that error appears in the above-identified patent and that said Letters Patent is hereby corrected as shown below:

Abstract [57], line 10, replace "ot" by --to--;

Claim 5, column 6, line 4, replace "has" by --have--;
Claim 7, column 6, line 15, replace "thermal" by --material--;

Signed and Sealed this

Ninth Day of February, 1993

Attest:

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 5,030,518
DATED     : July 9, 1991
INVENTOR(S) : Karl Keller

It is certified that error appears in the above-identified patent and that said Letters Patent is hereby corrected as shown below:

Claim 14, column 6, line 58, replace "Neschel" by --Nextel--

Claim 19, column 7, line 21, delete "an average";

Claim 19, column 7, line 22, replace "element diameter is" by --said constituent elements having diameters which are--;

Claim 19, column 7, line 23, replace "an average material den-" by --said porous material having densities which are --;

Claim 19, column 7, line 24, delete "sity is".

This certificate supersedes Certificate of Correction issued February 9, 1993

Signed and Sealed this

Thirteenth Day of July, 1993

Attest:

MICHAEL K. KIRK

Attesting Officer     Acting Commissioner of Patents and Trademarks